Dec. 8, 1925.  1,565,040
C. WASEIGE
BRAKE
Original Filed Feb. 9, 1921
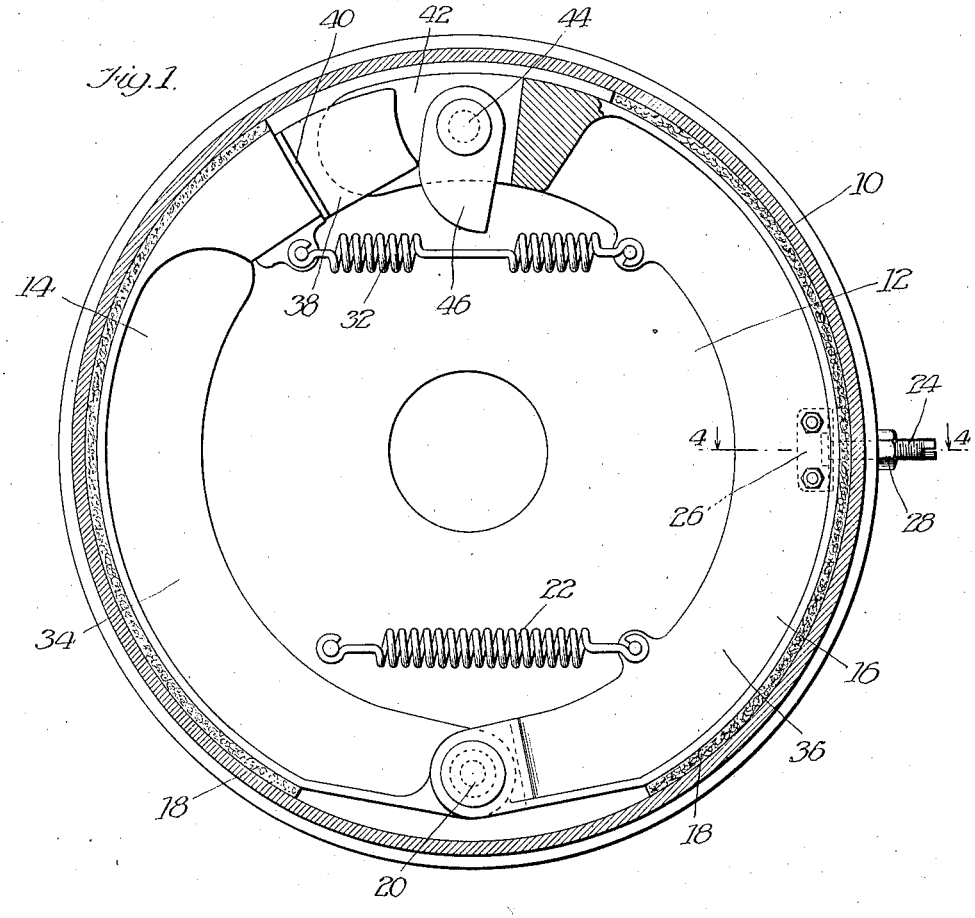
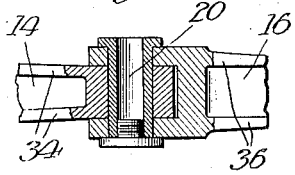
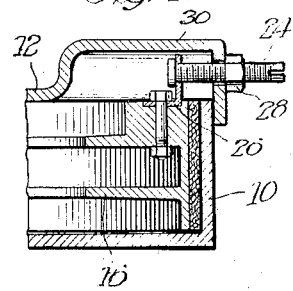
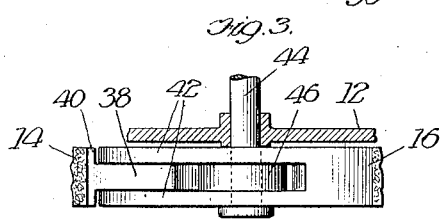
Witness
Martin H. Olsen.
Inventor
Charles Waseige
By M. W. McConkey
Atty.

Patented Dec. 8, 1925.

1,565,040

UNITED STATES PATENT OFFICE.

CHARLES WASEIGE, OF PARIS, FRANCE, ASSIGNOR TO SOCIÉTÉ DES AEROPLANES HENRI AND MAURICE FARMAN, OF BILLANCOURT, FRANCE, A CORPORATION OF FRANCE.

BRAKE.

Original application filed February 9, 1921, Serial No. 443,556. Divided and this application filed May 2, 1925. Serial No. 27,469.

*To all whom it may concern:*

Be it known that I, CHARLES WASEIGE, a citizen of France, residing at Paris, France, have invented certain new and useful Improvements in Brakes, of which the following is a specification.

This invention relates to brakes, and is illustrated as embodied in a novel "servo" or self-energizing brake for an automobile. An object of the invention is to take full advantage of the braking friction in applying the brake, by what is known as a servo or self-energizing action, while avoiding the various disadvantages of prior constructions, such as dragging of the shoes, liability to "grab" or lock so they cannot be released, etc.

Having this object in view, the invention contemplates the use of one brake shoe, having a limited circumferential movement with the brake drum, to force an anchored shoe against the drum, the anchored shoe thereupon serving as an anchor for the first or servo shoe. Preferably this method of operation is insured by means such as a spring, which holds the anchored shoe out of engagement with the drum until the servo shoe is urged circumferentially by a combination of the brake-actuating means and the friction of the drum to overcome the resistance of the spring. When the brake is idle the spring may hold the anchored shoe against a novel stop. In the illustrated embodiment the servo shoe is moved into engagement with the drum by a novel cam, which is preferably substantially irreversible, and which does not restrain circumferential movement of the shoe.

Other features of the invention relate to various novel combinations of parts and desirable particular constructions which will be apparent from the following description of the illustrative embodiment shown in the accompanying drawings, in which:

Figure 1 is a vertical section through the brake, taken just inside the wheel and looking toward the center of the chassis, and showing the shoes in side elevation;

Figure 2 is a partial plan view looking down on the pivotal connection of the shoes, and broken away to show the connection in horizontal section;

Figure 3 is a horizontal section just inside the drum, showing the ends of the shoes in top plan; and Figure 4 is a horizontal section on the line 4—4 of Figure 1, showing the novel stop for the anchored shoe.

In the arrangement selected for illustration, the brake includes a drum 10 carried by the road wheel of a vehicle, and provided with a stationary (i. e. non-rotating) backing plate 12, while within the drum are arranged a plurality of arcuate shoes 14 and 16, preferably of aluminum faced with metallo-plastic friction material 18, of asbestos and brass, or other suitable material. A connection, such as a hollow rivet 20, between the shoes provides for the forcing of shoe 16 against the drum 10 by circumferential movement of shoe 14.

In order to insure this action, shoe 16 is held by a coil tension spring 22, connected to backing plate 12, in an idle position determined by a stop 24, having a head to engage a bracket 26 projecting from shoe 16, and threaded to receive an adjustable nut 28 engaging a part 30 pressed out of the backing plate 12. Shoe 14 is urged toward idle position by a spring 32, shown connected between the two shoes.

The shoes have parallel flanges 34 and 36 on their inner surfaces, forming angular or channel-shaped reinforcing ribs. As the aluminum of shoe 14 is too soft advantageously to be operated on by the brake cam, I provide a steel or other hardened cam-engaging member 38 fitting between the flanges 34, and having a thrust flange 40 engaging the end of the shoe. The member 38, thus forming the end of shoe 14, is guided and embraced by the parallel arms of the forked end 42 of shoe 16, as best appears in Figure 3.

Shoe 16 is anchored, at the end opposite the connection 20, by being pivotally mounted on a shaft 44 carrying a cam 46 between the arms of the forked end 42 in engagement with member 38 of shoe 14. The cam shown is formed on an involute curve, and is substantially irreversible.

In operation, rocking cam 46 swings shoe 14 around the connection 20, against the resistance of spring 32, into engagement with drum 10. The friction of the drum urges the shoe circumferentially in a counter-clockwise direction in Figure 1 (when the vehicle is moving forward), and a slight movement of this shoe operates to swing shoe 16 toward the drum against the resistance of spring 22. Thereafter the connection 20 serves as an anchor for shoe 14, and transmits the braking torque of that shoe through the shoe 16 to its anchor.

While one illustrative embodiment of the invention has been described in detail, it is not my intention to limit its scope to that particular embodiment, or otherwise than by the terms of the appended claims. The present application is a division of my application No. 443,556, filed February 9, 1921.

I claim:

1. In combination with a drum, an internal brake for engaging the drum consisting of a plurality of connected shoes having two separated ends, a spindle and brake actuating means disposed between said separated ends so that one end tends to contact with said brake actuating means, and the other end is pivoted upon the spindle, a spring engaging a shoe and normally tending to hold said ends in such position as and for the purposes described, and means acting on the shoes adjacent their connection and insuring engagement with the drum of the shoe in contact with said means prior to engagement with the drum of the shoe pivoted on the spindle.

2. In combination with a drum, an internal brake of the self energizing type wherein one part reacts an another part, for engaging the drum, said brake having at least two connected shoes, actuating means for operating the shoes, said means being arranged to act on at least one of said shoes, another of said shoes being pivoted closely adjacent the actuating means but independent thereof, a main return spring acting between the last mentioned brake shoe and the unanchored shoe and at points relatively close to the cam and said pivot, a secondary return spring connected at one end to a stationary member independent of the brake shoes and at the other end to one shoe near the end connected to the other shoe, and an adjustable stop for predetermining the clearance of said pivoted shoe from the drum.

3. In combination with a drum, an internal brake of the self energizing type, comprising two connected shoes, a cam with means for actuating the same, the end of one shoe being provided with a cam follower, means for guiding said follower, the other brake shoe being pivoted closely adjacent the cam, but independent thereof, a main spring acting between the two shoes at points near to but on opposite sides of said cam follower, and a secondary spring connected at one end to a stationary member independent of the brake shoes, and the other end to the pivoted shoe near its joint as and for the purposes described.

4. In combination with a drum, an internal brake of the self energizing type composed of connected shoes, brake actuating means for moving said shoes into contact with the drum, an adjustable device intermediate the ends of one of the shoes and engaging the same, and means independent of said actuating means and engaging the other shoe to position it laterally.

5. In a brake mechanism, including a rotatable member and a brake therefor, means for obtaining a self energizing action of the brake on said rotatable member, comprising connected brake shoes anchored at one end, means for acting on the unanchored end to move the brake into engagement with said rotatable member, a support for said means, and means engaging opposite sides of the unconnected end of the unanchored shoe to position it axially of the drum so as to hold it in proper working relation to said means.

6. In combination with a drum, an internal brake of the self energizing type wherein the rotation of the drum assists in applying the brakes, said brake having connected shoes with one end responsive to an operating member and one end relatively pivoted, and an operating member for moving said responsive end to apply said shoes to the drum, a main returning means for the shoe end responsive to the operating member and an auxiliary spring connected at one end to a relatively stationary member and at the other end to one of the connected shoes near the point of connection.

7. In combination with a drum, an internal brake of the self energizing type wherein the rotation of the drum assists in applying the brakes, said brake having a plurality of connected shoes with at least one end responsive to an operating member and one end relatively pivoted on a part of the operating means and extending into guiding relationship with the first mentioned end and an operating member for moving said responsive end to apply said shoes to the drum, means for returning the shoes when released and means for adjusting with respect to the drum, at least one of said shoes intermediate its ends.

8. In combination with a drum, a self energizing brake comprising a plurality of connected brake shoes, one end being relatively fixed, operating means acting on the other end of the brake to move this end of the brake into contact with the drum and a spring attached at one end to a relatively non-movable member and the other end to said shoe having the relatively fixed end whereby the last mentioned shoe is brought into engagement with the drum after the free end of the brake.

9. A brake comprising, in combination, a drum, an expansible friction device within the drum, a support adjacent the drum, a pivot carried by the support and serving as an anchor for one end of the friction device, expanding means acting on the unanchored end of said device, means urging the unanchored end of said device inwardly away from the drum, and a tensioned spring connected at its opposite ends to the support and to the friction device approximately midway of its length and insuring engagement with the drum of the unanchored end of the device prior to engagement with the drum of the anchored end of the device.

10. A brake comprising, in combination, a drum, connected primary and secondary shoes within the drum, a fixed pivot anchor for one end of one of the connected shoes, an operating device engaging the other of the connected shoes to move the primary shoe against the drum without restraining said primary shoe from limited circumferential movement caused in part by the friction of the drum and effective to increase the force of the secondary shoe against the drum, and a spring adjacent the connected ends of the shoes and arranged to swing the anchored shoe about its anchored end away from the drum until overcome by movement of the unanchored shoe.

11. A brake comprising, in combination, a drum, a floating rigid and arcuate primary shoe, a secondary rigid and arcuate shoe anchored at one end, in a manner preventing movement of the anchored end radially inward of the drum, means for moving the primary shoe against the drum so that it is urged circumferentially by frictional engagement therewith, a spring and a stop co-operating to hold the secondary shoe away from the drum while the primary shoe is moved against the drum, the spring acting on the shoe on the opposite side of the stop from the anchored end, and a connection operated by circumferential movement of the primary shoe for moving the secondary shoe against the drum.

12. A brake comprising, in combination, a drum, a floating rigid and arcuate primary shoe within the drum, a secondary rigid and arcuate shoe anchored at one end within the drum, means for moving the primary shoe against the drum so that it is urged circumferentially by frictional engagement therewith, a connection operated by circumferential movement of the primary shoe for moving the secondary shoe against the drum, and means acting on one of the shoes adjacent its connected end to insure successive operation of the shoes.

13. A brake comprising, in combination, a drum, a stationary member, a shoe within the drum anchored at one end and having a spring connected at its end to the stationary member and urging the shoe inwardly away from the drum, an unanchored servo shoe within the drum, a connection operated by circumferential movement of the servo shoe to force the anchored shoe against the drum, and means to move the unanchored shoe against the drum to be urged circumferentially by the friction of the drum.

14. A brake comprising, in combination, a drum, a stationary member, a shoe within the drum anchored at one end, an unanchored shoe, connecting means operated by circumferential movement of the unanchored shoe to force the anchored shoe against the drum, and means for determining an idle position of the shoes out of engagement with the drum including a coil tension spring connected at one end to one of the shoes adjacent the end connected by said means to the other shoe and at the other end to the stationary member.

15. A brake comprising, in combination, a shoe forked at one end to provide parallel arms, another shoe having its end projecting between the arms, and an operating cam between the arms and between the two shoes.

16. A brake comprising, in combination, a cam and a shaft for operating it, a shoe anchored at one end on the shaft, another shoe pivotally connected to the unanchored end of the first shoe and having its free end engaging the cam and parts projecting past the sides of the cam and slidably embracing the sides of the unanchored shoe to position it laterally.

17. A brake comprising, in combination, a shoe forked at one end to provide a pair of arms, another shoe having its end projecting between the arms, and a brake-operating device between the shoes and between said arms.

18. A brake comprising, in combination, a drum, connected shoes anchored at one end of one of the shoes within the drum, a brake-applying device acting on the unanchored shoe, and means connected to one of the shoes adjacent its connected end and urging the unanchored end of the anchored shoe away from the drum and insuring engagement of the unanchored shoe with the drum prior to engagement of the anchored shoe with the drum.

19. A brake comprising, in combination, a drum, a primary shoe within the drum, a secondary shoe anchored at one end within the drum, a brake-applying device for forcing the shoes outwardly against the drum, and means acting on the unanchored end of the secondary shoe and urging it away from the drum and arranged to insure engagement of the primary shoe with the drum prior to engagement of the secondary shoe with the drum.

20. A brake comprising, in combination, a drum, an anchored shoe pivoted at one end within the drum, a servo shoe related to the anchored shoe, the shoes being arranged end to end, a brake-applying device acting on the servo shoe, and connecting and controlling means acting on the adjacent ends of the shoes and arranged to insure engagement of the anchored shoe with the drum after the engagement of the servo shoe with the drum.

21. A brake comprising, in combination, a drum, connected shoes anchored at one end of one of the shoes within the drum, a brake-applying device acting on the unanchored shoe, and a spring acting on the anchored shoe adjacent its unanchored end and arranged to insure engagement of the unanchored shoe with the drum prior to engagement of the anchored shoe with the drum.

22. A brake comprising, in combination, a drum, connected shoes anchored at one end of one of the shoes within the drum, a spring connected to the unanchored shoe, means for forcing the unanchored shoe against the drum against the resistance of said spring, and means for insuring engagement with the drum of the unanchored shoe prior to the anchored shoe.

23. A brake comprising, in combination, a drum, connected shoes anchored at one end of one of the shoes within the drum and extending substantially more than 180°, means for forcing the unanchored shoe against the drum, and a pair of springs, one urging the unanchored end of the shoes away from the drum, and the other urging the connected ends of the shoes away from the drum.

24. A brake comprising, in combination, a drum, connected shoes anchored at one end of one of the shoes within the drum and extending substantially more than 180°, means for forcing the unanchored shoe against the drum, and a spring acting on the shoes near their connection to cause the unanchored shoe to be swung by said means about the connection against the drum prior to engagement of the anchored shoe with the drum.

25. A brake comprising, in combination, a drum, a pair of shoes within the drum, one of which is anchored at one end, a connection between the shoes, means for forcing the unanchored shoe against the drum, the anchored shoe being forced against the drum partly by the action of said means and partly by the friction of the drum against the unanchored shoe, and a spring connected to the unanchored end of the anchored shoe and arranged to urge the anchored shoe away from the drum to prevent it from dragging against the drum, the spring being overcome in forcing the anchored shoe against the drum.

26. A brake comprising, in combination, a drum, a shoe anchored at one end within the drum and restrained from circumferential movement at its anchored end, an unanchored shoe connected with the unanchored end of the anchored shoe, and spring means acting adjacent the connected ends of the shoes and adjacent the unconnected end of the unanchored shoe and urging the shoes away from the drum.

In testimony whereof I have hereunto signed my name.

CHARLES WASEIGE.